United States Patent [19]
Boichot et al.

[11] Patent Number: 6,112,866
[45] Date of Patent: *Sep. 5, 2000

[54] SEMI-ACTIVE SUSPENSION SYSTEM WITH CONTROL CIRCUIT HAVING A DIRECT CONTROL LOOP INCLUDING AN INVERSE MODEL OF THE DAMPER

[75] Inventors: Philippe Boichot, Quetigny; Régis Kirat, Le Creusot, both of France

[73] Assignee: GEC Alsthom Transport SA, Paris, France

[*] Notice: This patent is subject to a terminal disclaimer.

[21] Appl. No.: 08/889,594

[22] Filed: Jul. 8, 1997

Related U.S. Application Data

[63] Continuation of application No. 08/498,132, Jul. 5, 1995, Pat. No. 5,682,968.

[30] Foreign Application Priority Data

Jul. 6, 1994 [FR] France ................................. 9408337

[51] Int. Cl.[7] ..................................................... F16F 9/34
[52] U.S. Cl. ........................................ 188/299.1; 188/318
[58] Field of Search ................................ 188/299.1, 314, 188/318, 280, 281, 289; 267/136; 280/707, 714

[56] References Cited

U.S. PATENT DOCUMENTS

| 4,887,699 | 12/1989 | Ivers et al. |
| 4,986,393 | 1/1991 | Preukschat et al. |
| 5,024,302 | 6/1991 | Karnopp . |
| 5,337,864 | 8/1994 | Sjostrom . |

FOREIGN PATENT DOCUMENTS

| 2667907 | 2/1993 | France . |
| 2660705 | 6/1993 | France . |
| 4103188 C1 | 4/1992 | Germany . |
| WO9106439 | 5/1991 | WIPO . |

Primary Examiner—Robert J. Oberleitner
Attorney, Agent, or Firm—Sughrue, Mion, Zinn, Macpeak & Seas, PLLC

[57] ABSTRACT

The present invention relates to a semi-active damper controlled by a control circuit including a direct control loop made up of an inverse model of the damper. The inverse model of the damper determines an ideal value for an electrical current $i_{th}$ for controlling a compression controlled-restriction valve and an expansion controlled-restriction valve on the basis of a measured value for a relative speed $\dot{y}$ between the two ends of the damper and on the basis of a force reference value Fc. The semi-active damper of the invention is applicable as a transverse secondary suspension for a passenger rail vehicle.

8 Claims, 1 Drawing Sheet

SEMI-ACTIVE SUSPENSION SYSTEM WITH CONTROL CIRCUIT HAVING A DIRECT CONTROL LOOP INCLUDING AN INVERSE MODEL OF THE DAMPER

This is a continuation of application Ser. No. 08/498,132 filed Jul. 5, 1995 now U.S. Pat. No. 5,681,968.

The present invention relates to the relationships for controlling hydraulic dampers in general, and it relates more particularly to a semi-active damper.

BACKGROUND OF THE INVENTION

French patents FR 2 660 705 and FR 2 667 908 in the name of Regie Nationale des Usines Renault relate to servo-controlling the force of hydraulic actuators in a car suspension.

The devices described constitute active suspensions obtained by applying control theory optimized by minimizing quadratic criteria.

The term "active suspension" is used for suspensions that make use of energy generation, which energy may be hydraulic, pneumatic, or electrical, and with high levels of power being involved.

In addition, a suspension is set to be "semi-active" when it possesses variable characteristics that are controlled but without significant power being supplied.

A control relationship that takes account of measurements performed by sensors on a vehicle and representing movements of the vehicle make it possible to calculate the forces that the suspensions need to apply at any instant in order to minimize the desired criterion.

For example, the criterion may be seeking to reduce vibration or to limit vibration amplitude.

The forces calculated in this way constitute reference forces that the members of the suspension ought to follow. Such members then act as servo-controlled force generators with a force negative feedback loop.

Under ideal circumstances, each force servo-control loop corresponding to each of the suspension members of the vehicle is implemented by a hydraulic actuator powered at high pressure and provided with a force sensor and with a servo-valve.

Such a solution is described, for example, in French patents FR 2 660 705 and FR 2 667 907.

From patent FR 2 660 705 it can be seen that the essential problem lies in the difficulty of achieving force servo-control with an actuator when the actuator is itself subjected to large amplitude movements at relatively low frequency, as is the case in the context of a car suspension.

In other words, this difficulty gives rise to the car suspension having impedance that is highly variable.

Patent FR 2 660 705 describes a corrector for correcting the control current of the servo-valve on the basis of the measured relative speed between the two ends of the actuator.

The device described in patent FR 2 660 705 thus makes use of an inverse model of the servo-valve integrated in a positive correction loop which is superposed on the main feedback loop for force servo-control.

Another characteristic of the prior art device is that the inverse servo-valve model used also takes account of the force implemented, as measured, in addition to the relative speed, as measured.

The prior art device constitutes a suspension that is active in the sense that the device includes a high pressure hydraulic generator system.

An advantage of the semi-active damper of the invention is that it does not include hydraulic generation, because the device of the invention constitutes a device that is semi-active, in that it produces a damping relationship that is varied under control.

Another limitation of conventional damper devices is that the damping relationship is unique in character and is "frozen" by construction.

OBJECTS AND SUMMARY OF THE INVENTION

An object of the invention is to provide a semi-active damper enabling the vibratory comfort of a rail vehicle to be improved.

Another object of the invention is to provide a semi-active damper enabling the comfort of rail vehicles that are already in operation to be improved, providing that electronic control is installed therein.

According to the invention, the control circuit includes a direct control loop constituted by an inverse model of the damper.

The invention also provides a semi-active damper controlled by a control circuit that satisfies at least one of the following characteristics:

the inverse model of the damper determines a value for an ideal control electrical current $i_{th}$ for controlling a compression controlled-restriction valve and an expansion controlled-restriction valve on the basis of a measured value for a relative speed $\dot{y}$ between two ends of the damper and on the basis of a force reference value Fc;

a force feedback includes a proportional type corrective term $\delta i$ in said ideal control electrical current $i_{th}$ so as to take account of a force error $\epsilon F$ between said force reference value Fc and a measured value for a force F actually exerted; and the inverse model of the damper is defined by the expressions:

$$i_{th} = K_{23} \frac{|\dot{y}|}{\sqrt{|Fc|}},$$

in expansion ($\dot{y}>0$); and $$i_{th} = K_{13} \frac{|\dot{y}|}{\sqrt{|Fc|}},$$

in compression ($\dot{y}<0$)

where $K_{13}$ and $K_{23}$ are positive constants that depend on the size of the actuator, on the physical characteristics of the oil, and also on the flow rate response of the hydraulic controlled-restriction valves.

As mentioned above, an advantage of the semi-active damper of the invention is that it does not need a source of energy, a pump, or a compressor.

Another advantage of the semi-active damper of the invention is that the damping relationship of the damper is itself under control, thereby making it possible in continuous manner to implement an infinity of relative force-speed relationships.

Another advantage of the semi-active damper of the invention is that the conventional damper is replaced by a controlled damper member at the expense solely of making modifications to the electrical wiring.

Another advantage of the semi-active damper of the invention is that its operation under fault conditions is the same as that of a conventional damper.

Another advantage of the semi-active damper of the invention is that it provides 20% to 50% improvement in vibratory comfort, depending on the type of vehicle concerned.

Another advantage of the semi-active damper of the invention stems from the use of an inverse model of the damper.

The use of an inverse model of the damper makes it possible to determine the control current for the servo-valve as a function of measured relative speed and as a function of the reference force, and not on the basis of the measured relative speed and the resulting force, as has been done in the state of the art, as mentioned above.

BRIEF DESCRIPTION OF THE DRAWING

Other objects, characteristics, and advantages of the invention appear on reading the following description of the preferred embodiment of a semi-active damper, which description is made with reference to the drawing, in which.

MORE DETAILED DESCRIPTION

Figure 1:
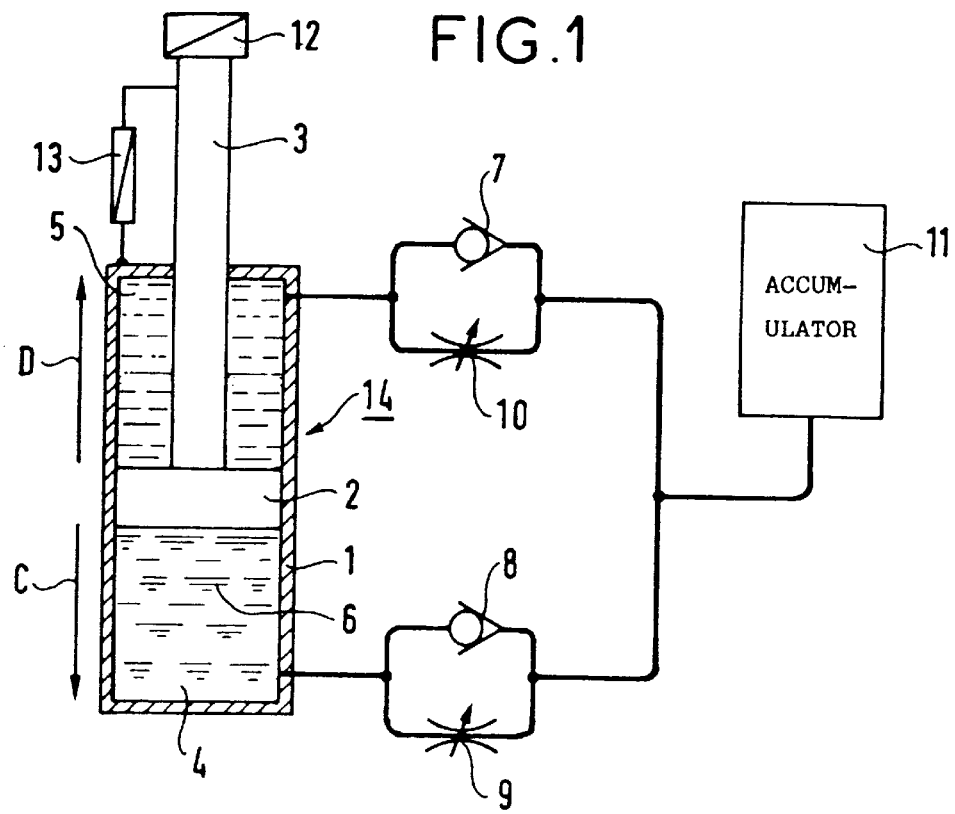
FIG. 1 is a diagram showing the principles of a controlled semi-active damper of the invention.

FIG. 1 is a diagram showing the principles of a controlled semi-active damper of the invention.

The controlled semi-active damper of the invention comprises a body 1 in which there slides a solid piston 2 provided with a rod 3, such that the assembly constitutes an actuator 14.

The piston 2 defines a first chamber 4 referred to as a compression chamber and a second chamber 5 referred to as an expansion chamber.

The body 2 is filled with a fluid 6, e.g. hydraulic oil.

The semi-active damper also comprises a first non-return valve 7 referred to as the compression valve, and a second non-return valve 8 referred to as the expansion valve.

First and second electrically-controlled hydraulic restriction valves 9 and 10 comprise a compression first controlled-restriction valve 9 and an expansion second controlled-restriction valve 10.

The semi-active damper also comprises a precharged oleopneumatic accumulator 11 constituted by a chamber.

Such an accumulator 11 constitutes a fixed volume containing an inert gas under pressure and hydraulic oil to which the gas communicates its pressure.

The two fluids are generally physically separated by a membrane or a bladder.

The functions of the accumulator consist firstly in absorbing the volume of oil that corresponds to the volume of the rod when the damper is fully compressed, and secondly in maintaining at least a minimum pressure in the hydraulic circuit.

The compression valve 7 and the expansion controlled-restriction valve 10 are connected in parallel and are disposed between the expansion chamber 5 and the chamber of the accumulator 11.

The expansion valve 8 and the compression controlled-restriction valve 9 are connected in parallel and they are disposed between the compression chamber 4 and the chamber of the accumulator 11.

Finally, the semi-active damper includes a force sensor 12 and a relative speed sensor 13.

Figure 2:
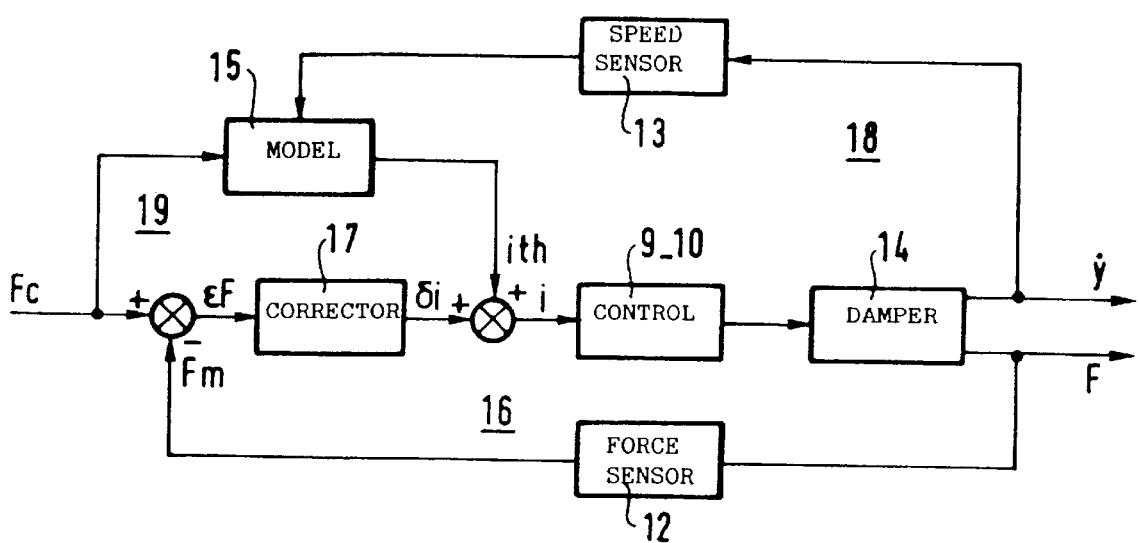
FIG. 2 is a block diagram of the control circuit of the controlled semi-active damper of the invention.

FIG. 2 is a block diagram showing how a semi-active damper of the invention is controlled.

The references used in FIG. 2, and their meanings are listed below:

Fc: force reference;

F: actual force;

Fm: actual force F as measured by sensor;

$\epsilon F$: force error $\epsilon F=Fc-Fm$;

$\dot{y}$: relative speed between the two ends of the damper;

i: electrical current for controlling the controlled-restriction valves;

$i_{th}$: ideal control current as determined using the inverse model and for application to the hydraulic controlled-restriction valves in order to obtain the force Fc; and $\delta i$: additional correction to $i=i_{th}+\delta i$ to take account of the force error $\epsilon F$.

The hydraulic operation of the controlled semi-active damper of the invention is described below with reference to FIGS. 1 and 2.

Two stages can be distinguished in the hydraulic operation of the controlled semi-active damper of the invention:

a first stage refereed to as the compression stage symbolized in FIG. 1 by arrow C; and a stage referred to as the expansion stage, and symbolized in FIG. 1 by arrow D.

During the compression stage, the piston 2 penetrates into the body 1 of the actuator, and during the expansion stage, the piston 2 moves outwardly relative to the body 1 of the actuator.

In the compression stage, the fluid 6 contained in the compression chamber 4 is compressed. The expansion non-return valve 8 is closed, thereby constraining the fluid to pass through the compression controlled-restriction valve 9.

The compression non-return valve 7 allows the fluid 6 to short-circuit the expansion controlled-restriction valve 10 and to fill the expansion chamber 5 freely.

Control applied to the compression controlled-restriction restriction valve 9 serves to control the pressure level in the compression chamber 4, and thus to control the reaction force exerted in compression.

In the expansion stage, the functions of the members are reversed.

The expansion controlled-restriction valve 10 controls the flow of fluid 6 from the expansion chamber 5 into the chamber of the accumulator 11, thereby enabling the expansion force to be modulated.

The expansion non-return valve 8 is active and allows the fluid 6 to pass freely from the expansion chamber 5 into the chamber of the accumulator 11.

The compression and expansion controlled-restriction valves 9 and 10 constituting flow actuating means are controlled (preferably electrically) in such a manner as to modulate the damping force which is always in opposition to the speed.

It results from the above that damping remains a dissipative system.

Modulation of the force exerted makes it possible to servo-control said force to a reference force Fc generated by a computer (not shown).

The basic problem consists in determining the control current i to be applied to the compression and expansion controlled-restriction valves 9 and 10 in order to achieve the reference force Fc.

By using relationships representative of equilibrium in the volume flow rates for each chamber of the damper at constant speed, both for the compression stage and for the expansion stage, has made it possible to deduce a simple relationship between the current $i_{th}$ delivered by an inverse model 15 of the damper, the instantaneous relative speed $\dot{y}$ and the damping force.

For example, in the expansion stage, this relationship is given by the following equation:

$$F = \frac{1}{2}\rho\left(\frac{S_2}{Gi \times i}\right)^2 \times S_2 \times \dot{y}^2 + \frac{1}{2}\rho\left(\frac{S_1}{Cd \times A_{31}(\Delta P_{31})}\right)^2 \times S_1 \times \dot{y}^2 - (P_3 - Pe) \times St$$

where:

F is the damping force exerted;

ρ is the density of oil;

$S_1$ is the section of the piston subjected to pressure on the side without a piston rod;

$S_2$ is the section of the piston subjected to pressure on the side with the piston rod;

St is the section of the rod;

$\dot{y}$ is relative speed;

Gi is the pressure response of the controlled-restriction valve;

i is control current;

Cd is the flow rate coefficient of the expansion non-return valve;

$A_{31}$ is the geometrical flow section of the expansion non-return valve;

$\Delta P_{31}$ is the head loss between the accumulator and the chamber in suction;

$P_3$ is the pressure in the accumulator; and

Pe is atmospheric pressure.

Making use of this damper model, in the sense that a search is made for the current $i_{th}$ for applicaton to the control members as a function of the desired force Fc and of the measured speed $\dot{y}$, amounts to making use of an inverse model 15 of the damper.

Because of simplifications in establishing the damping relationship and thus in the inverse model 15 of the damping, a proportional type correction term δi is introduced by means of a force feedback loop 16.

By using the force sensor 12 to provide a measurement Fm of the force F that is exerted, the feedback loop 16 makes it possible to generate an error signal εF between the reference Fc and the measured force Fm.

This error signal εF is applied to a corrector 17 which delivers the additional correction δi to the control current i for the controlled-restriction valves 9 and 10.

The value of the relative speed $\dot{y}$ is inserted into the inverse model 15 of the damper via a speed feedback loop 18.

The speed feedback loop 18 includes the speed sensor 13.

The value of the ideal control current $i_{th}$ is determined by the inverse model 15 of the damper.

The ideal control current $i_{th}$ is applied to the hydraulic controlled-restriction valves to obtain the force Fc via a direct control loop 19.

The direct control loop 19 includes the inverse model 15 of the damper which is defined, for example, by the following expressions:

$$i_{th} = K_{23}\frac{|\dot{y}|}{\sqrt{|Fc|}},$$

in expansion ($\dot{y}>0$); and $$i_{th} = K_{13}\frac{|\dot{y}|}{\sqrt{|Fc|}},$$

in compression ($\dot{y}<0$)

where $K_{13}$ and $K_{23}$ are positive constants that depend on the size of the actuator, on the physical characteristics of the oil, and also on the flow rate response of the hydraulic controlled-restriction valves.

The semi-active damper of the invention is applicable as a transverse secondary suspension for a passenger rail vehicle.

What is claimed is:

1. A semi-active suspension system comprising:

an actuator within a hydraulic circuit having relatively movable first and second ends, a damping cylinder, a solid piston slidably mounted in said cylinder and defining with said cylinder a first, compression chamber and a second, expansion chamber, a damping fluid in said cylinder and within said first and second chambers, flow actuating means in said hydraulic circuit for controlling replenishment and evacuation of damping fluid alternatively in said first and second chambers, and a control circuit connecting said flow actuating means to said first and second chambers of said actuator, the improvement comprising:

a direct control loop in said control circuit comprising an inverse model of said semi-active damper, means for supplying a generated reference force signal Fc to said inverse model, a speed feedback loop for supplying a signal of measured relative speed $\dot{y}$ to said inverse model, and wherein said inverse model further comprises means responsive to said signals Fc and $\dot{y}$ for supplying a control signal $i_{th}$ to said flow actuating means as a function of measured relative speed $\dot{y}$ and as a function of the reference force Fc, thereby servo-controlling the damping force on the actuator which is in opposition to the measured relative speed $\dot{y}$ and to said generated reference force Fc.

2. A semi-active suspension system according to claim 1, wherein an accumulator is operatively coupled to said flow actuating means, and wherein said flow actuating means comprises a compression controlled-restriction valve and an expansion controlled-restriction valve and wherein said accumulator comprises a precharged oleopneumatic accumulator coupled to said flow actuating means to maintain at least a minimum pressure in the flow actuating means hydraulic circuit.

3. A semi-active suspension system according to claim 1, further comprising a force feedback loop operatively connected between said actuator and said flow actuating means and including a force sensor to measure a force F exerted on said actuator, and means for comparing said exerted force F with said reference force Fc and for generating an error signal εF and means for applying said error signal εF to said flow actuating means to thereby servo-control the exerted damping force F to said force reference signal Fc.

4. A semi-active suspension system according to claim 2, in which said inverse model of the damper is defined by the expressions:

$$i_{th} = K_{23} \frac{|\dot{y}|}{\sqrt{|Fc|}},$$

in expansion; and $$i_{th} = K_{13} \frac{|\dot{y}|}{\sqrt{|Fc|}},$$

in compression
where; $i_{th}$ is the ideal control electrical current for controlling said flow actuating means, $K_{13}$ and $K_{23}$ are positive constants that depend on the size of the actuator, on the physical characteristics of oil within the hydraulic circuit, and also on the flow rate responses of the restriction valves; $\dot{y}$ is a measured value of relative speed of movement between the ends of the damper and Fc is a computed, control force reference value.

5. A semi-active suspension system according to claim 4, further comprising a force feedback loop operatively connected between said actuator and said flow actuating means and including a force sensor to measure a force F exerted on said actuator, and means for comparing said exerted force F with said reference force Fc and for generating an error signal $\epsilon$F and means for applying said error signal $\epsilon$F to said flow actuating means to thereby servo-control the exerted damping force F to said force reference signal Fc.

6. A semi-active suspension system comprising:
  an actuator within a hydraulic circuit having relatively movable first and second ends, a damping cylinder, a solid piston slidably mounted in said cylinder and defining with said cylinder a first, compression chamber and a second, expansion chamber, a damping fluid in said cylinder and within said first and second chambers, flow actuating means in said hydraulic circuit for controlling replenishment and evacuation of damping fluid alternatively in said first and second chambers, and a control circuit connecting said flow actuating means to said first and second chambers of said actuator,
  the improvement comprising:
    a direct control loop in said control circuit comprising an inverse model of said semi-active damper, means for supplying a generated reference force signal Fc to said inverse model, a speed feedback loop for supplying a signal of measured relative speed $\dot{y}$ to said inverse model, said inverse model further comprising means responsive to said signals Fc and $\dot{y}$ for supplying a control signal $i_{th}$ to said flow actuating means as a function of measured relative speed $\dot{y}$ and as a function of the reference force Fc, thereby servo-controlling the damping force on the actuator which is in opposition to the measured relative speed $\dot{y}$ and to said generated reference force Fc, and wherein one end of said direct control loop is connected downstream of said force reference Fc to create said control signal $i_{th}$ applied directly to said flow actuating means, and wherein an accumulator is operatively coupled to said flow actuating means, and wherein said flow actuating means comprises a compression controlled-restriction valve and an expansion controlled-restriction valve, and wherein said accumulator further comprises a precharged oleopneumatic accumulator coupled to said flow actuating means to maintain at least a minimum pressure in the flow actuating means hydraulic circuit.

7. A semi-active suspension system according to claim 6, in which said inverse model of the damper is defined by the expressions:

$$i_{th} = K_{23} \frac{|\dot{y}|}{\sqrt{|Fc|}},$$

in expansion; and $$i_{th} = K_{13} \frac{|\dot{y}|}{\sqrt{|Fc|}},$$

in compression
where; $i_{th}$ is the ideal control electrical current for controlling said flow actuating means, $K_{13}$ and $K_{23}$ are positive constants that depend on the size of the actuator, on the physical characteristics of oil within the hydraulic circuit, and also on the flow rate responses of the restriction valves; $\dot{y}$ is a measured value of relative speed of movement between the ends of the damper and Fc is a computed, control force reference value.

8. A semi-active suspension system according to claim 7, further comprising a force feedback loop operatively connected between said actuator and said flow actuating means and including a force sensor to measure a force F exerted on said actuator, and means for comparing said exerted force F with said reference force Fc and for generating an error signal $\epsilon$F and means for applying said error signal $\epsilon$F to said flow actuating means to thereby servo-control the exerted damping force F to said force reference signal Fc.

* * * * *